United States Patent
Karande et al.

(10) Patent No.: US 10,325,283 B2
(45) Date of Patent: Jun. 18, 2019

(54) PACING OBJECTIVES OF AN ADVERTISING CAMPAIGN THROUGHOUT A DURATION OF THE ADVERTISING CAMPAIGN

(71) Applicant: Facebook, Inc., Menlo Park, CA (US)

(72) Inventors: Chinmay Deepak Karande, Mountain View, CA (US); Xiaohu Jiang, Palo Alto, CA (US); Zhengyong Zhu, San Jose, CA (US)

(73) Assignee: Facebook, Inc., Menlo Park, CA (US)

(*) Notice: Subject to any disclaimer, the term of this patent is extended or adjusted under 35 U.S.C. 154(b) by 1391 days.

(21) Appl. No.: 14/164,086

(22) Filed: Jan. 24, 2014

(65) Prior Publication Data
US 2015/0213488 A1 Jul. 30, 2015

(51) Int. Cl.
G06Q 30/00 (2012.01)
G06Q 30/02 (2012.01)

(52) U.S. Cl.
CPC ..... *G06Q 30/0246* (2013.01); *G06Q 30/0249* (2013.01)

(58) Field of Classification Search
None
See application file for complete search history.

(56) References Cited

U.S. PATENT DOCUMENTS

| | | | | |
|---|---|---|---|---|
| 2003/0149622 A1* | 8/2003 | Singh | ................ | G06F 17/30864 705/14.48 |
| 2009/0112691 A1* | 4/2009 | Abrams | ................ | G06Q 30/02 705/14.71 |
| 2010/0153197 A1 | 6/2010 | Byoun | | |
| 2010/0324996 A1 | 12/2010 | Kim et al. | | |
| 2011/0313814 A1 | 12/2011 | Briggs | | |
| 2012/0166532 A1 | 6/2012 | Hua et al. | | |
| 2013/0124297 A1 | 5/2013 | Hegeman et al. | | |
| 2013/0124308 A1 | 5/2013 | Hegeman et al. | | |
| 2013/0144720 A1* | 6/2013 | Hari | ................... | G06Q 30/0241 705/14.55 |

(Continued)

OTHER PUBLICATIONS

PCT International Search Report and Written Opinion, PCT Application No. PCT/US2014/034550, dated Oct. 21, 2014, eleven pages.

(Continued)

*Primary Examiner* — Michael W Schmucker
(74) *Attorney, Agent, or Firm* — Fenwick & West LLP

(57) ABSTRACT

An advertiser specifies an advertising campaign along with a budget, a duration and one or more objectives associated with the advertising campaign. An online system presenting advertisements from the advertising campaign determines an interval representing a portion of the duration, an interval budget, and one or more interval objectives. Historical information describing selection and presentation of advertisements by the online system is retrieved, and used to determine one or more filters limiting the number of opportunities to present an advertisement in which advertisements from the advertising campaign are included. The scaling filters may be based on the one or more interval objectives, bid amounts determined for advertisements in the advertising campaign, and bid amounts associated with advertisements previously selected for presentation form the historical data.

24 Claims, 6 Drawing Sheets

(56) References Cited

U.S. PATENT DOCUMENTS

2014/0156360 A1    6/2014  Shalita et al.
2014/0156566 A1    6/2014  Kabiljo et al.
2014/0156744 A1    6/2014  Hua et al.

OTHER PUBLICATIONS

Canadian Intellectual Property Office, Office Action, Canadian Patent Application No. 2,932,576, dated Apr. 27, 2017, four pages.

* cited by examiner

PACING OBJECTIVES OF AN ADVERTISING CAMPAIGN THROUGHOUT A DURATION OF THE ADVERTISING CAMPAIGN

BACKGROUND

This disclosure relates generally to online advertising, and more specifically to pacing impressions and reach of an online advertisement.

Advertisers may have certain goals when planning a new advertising campaign ("advertising campaign"). For instance, an advertiser may have a goal for the number of times an advertisement is presented to users of an online system (i.e., the number of "impressions" of the advertisement), the number of different online system users presented with an advertisement (i.e., the "reach" of the advertisement), and/or a duration during which the advertisement is presented. Conventionally, an advertiser may specify certain attributes of an advertising campaign or advertisements in an advertising campaign when specifying the advertising campaign. For example, an advertiser may identify targeting criteria associated with one or more advertisements in an advertising campaign and bid amounts associated with various advertisements in the advertising campaign.

Additionally, an advertiser may specify a time limit for the advertising campaign. The time limit stops the presentation of advertisements in the advertising campaign after the time limit expires, even if the budget of the advertising campaign has not been exhausted. Hence, the advertising campaign may be presented to users either until the budget is exhausted or the time limit expires. Particularly for advertising campaigns with low budgets, advertisements from the advertising campaigns may cease to be presented to users of an online system before the time limit of the advertising campaign have expired.

However, advertising campaigns may benefit from pacing the presentation of the ad to users over the time limit associated with the advertising campaign to allow advertisements from the advertising campaign to be presented to users for the duration of the time limit. Because conventional methods for advertisement selection identify advertisements from an advertising campaign eligible for presentation to an online system user and determine whether to present the identified advertisements to users fluctuations in the number of online system users eligible to be presented with advertisements in the advertising campaign may affect how rapidly a budget of the advertising campaign is exhausted. As the number of users eligible to be presented with advertisements from an advertising campaign is difficult to predict before the advertisements are selected for presentation and the amount an advertiser is willing to pay for presentation of advertisements in the advertising campaign may vary over time, conventional methods for advertisement selection limit an advertiser's ability to regulate presentation of advertisements from an advertising campaign throughout a time interval.

SUMMARY

A social networking system modifies inclusion of advertisements from an advertising campaign in auctions selecting advertisements presenting advertisements to social networking system users when opportunities to present advertisements are identified by the social networking system. The advertising campaign is associated with a budget, a duration, and one or more objectives. By modifying inclusion of advertisements in auctions, the social networking system allows an objective associated with the advertising campaign to be completed over the duration associated with the advertising campaign. For example, a number of impressions for advertisements in the advertising campaign are spread throughout the duration of the advertising campaign, rather than a shorter duration from more rapid spending of the advertising campaign's budget. As another example, presentation of advertisements from the advertising campaign to different users of the social networking system is spaced throughout the complete duration of the advertising campaign by regulating a number of auctions for presenting advertisements to social networking system users not previously presented with at least one advertisement from the advertising campaign.

The social networking system determines an interval specifying a portion of the advertising campaign's duration. For example, if the advertising campaign has a duration of a week, the interval is one day. Additionally, the social networking system determines a performance of the advertising campaign from a start date associated with the advertising campaign to a current time. The determined performance identifies a total number of times an advertisement from the advertising campaign was presented to social networking system users (i.e., impressions of advertisements from the advertising campaign) and a total number of different social networking system users presented with an advertisement from the advertising campaign (i.e., an amount of reach of the advertising campaign) from the start time of the advertising campaign to the current time. From the one or more objectives associated with the advertising campaign, the social networking system determines a target impression objective and a target reach objective at the end of the interval. Based on the determined performance and the target impression objective and the target reach objective, an interval impression objective and an interval reach objective are determined. The interval impression objective specifies a number of impressions of advertisements from the advertising campaign during the interval, while the interval reach objective specifies a number of different users to be presented with an advertisement from the advertising campaign during the interval. For example, the interval impression objective is based on a comparison of the number of impressions from the determined performance to the target impression objective, and the interval reach objective is based on a comparison of the number of different users presented with an advertisement from the advertising campaign from the determined performance to the target reach objective.

In some embodiments, the social networking system determines a pacing factor based on the budget associated with the advertising campaign and the amount spent by the advertiser on the advertising campaign at the current time. For example, a difference between the amount spent by the advertiser and the budget associated with the advertising campaign is determined, and a portion of the difference is allocated to the interval. Based on the pacing factor, the social networking system determines bid amounts associated with various advertisements in the advertising campaign. For example, a bid amount associated with an advertisement by an advertiser is modified based on the pacing factor, with the modified bid amount used when the social networking system determines whether to present the advertisement.

Information describing previously completed auctions is retrieved by the social networking system. The retrieved information identifies bid amounts associated with one or more advertisements selected from the previously completed auctions and may describe one or more social networking system users presented with advertisements selected from the previously completed auctions. Based on bid amounts associated with advertisements in the advertising campaign, as well as one or more objectives of the advertising campaign, the social networking system identifies a number of previously completed auctions in which an advertisement from the advertising campaign would have been selected for presentation. From the identified number of previously completed auctions, the interval impression objective, the interval reach objective, one or more scaling filters are determined and used to determine whether advertisements from the advertising campaign are included in auctions for subsequently identified opportunities to present advertisements. For example, a scaling filter specifies a percentage of auctions in which an advertisement from the advertising campaign is included, limiting the number of auctions that include advertisements from the advertising campaign.

Various scaling filters may be determined and used to determine whether to include advertisements form the advertising campaign in an auction for an identified opportunity to present advertisements. For example, a scaling filter is based on an interval impression objective and a number of previously completed auctions in which an advertisement from the advertising campaign would have been selected; this scaling filter is applied when an opportunity to present an advertisement is identified. As another example, a scaling filter is based on an interval reach and a number of previously completed auctions for presenting and advertisement to a user not yet presented with an advertisement from the advertising campaign in which an advertisement from the advertising campaign would have been selected. This scaling filter is not applied unless an identified opportunity is an opportunity to present an advertisement to a user not previously presented with an advertisement from the advertising campaign. One or more of the scaling filters may be modified at specified time intervals (e.g., daily) or after any other suitable criteria (e.g., a specified number of impressions, a specified number of opportunities to present advertisements, etc.).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1:
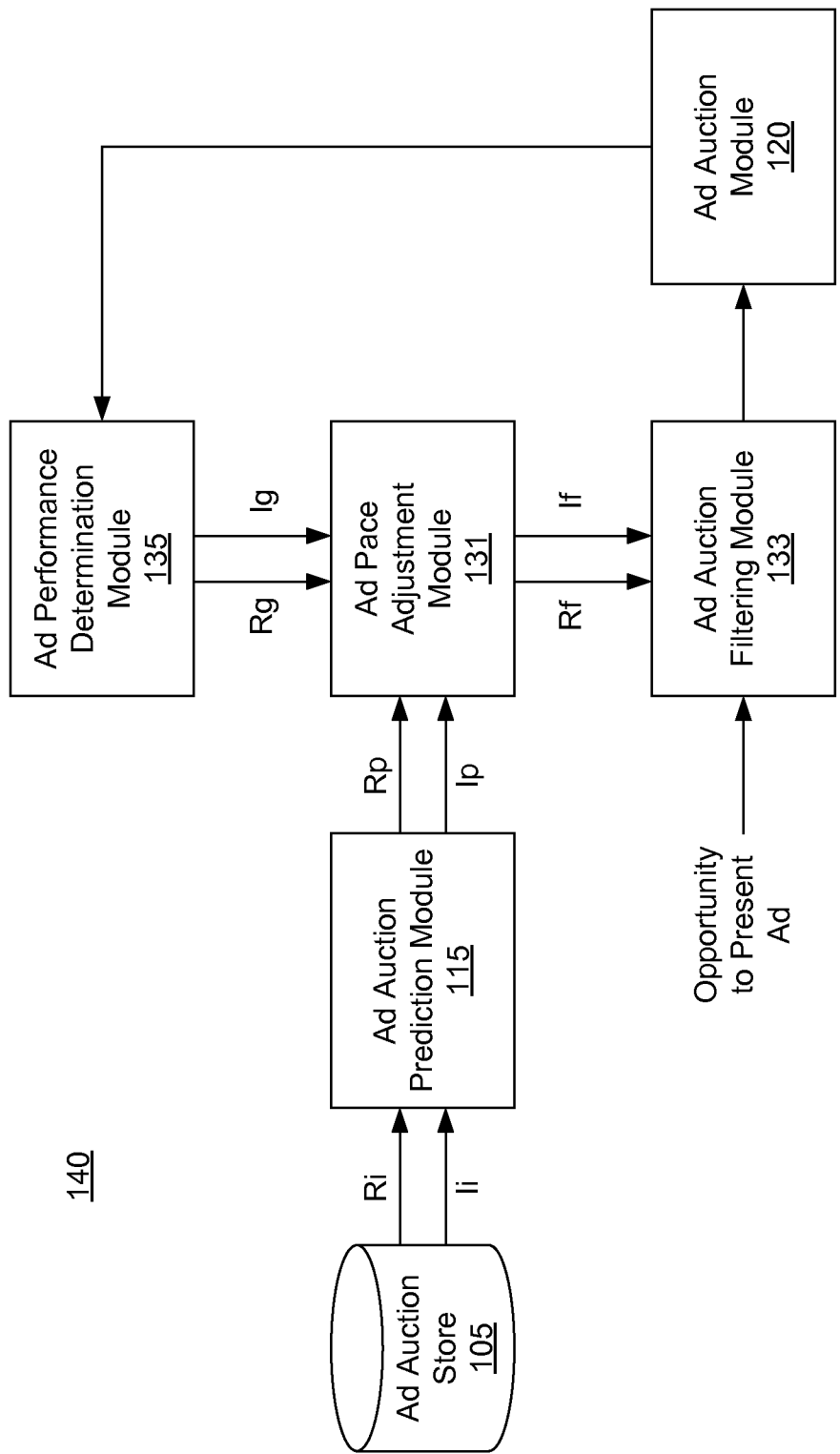
FIG. 1 is an overview of a system for adjusting the pace of an advertisement ("ad") campaign, in accordance with an embodiment.

FIG. 1 is an overview of a system for adjusting the pace at which advertisements from an advertisement ("ad") campaign are presented to users of an online system, such as a social networking system 140. In the example of FIG. 1, the system is a social networking system 140, although the functionality described in conjunction with FIG. 1 may be provided by other online systems. Adjusting the pace of presentation of advertisements from the advertising campaign allows an advertiser to modify the number of impressions of advertisements or the number of distinct users of the online system presented with advertisements from the advertising campaign (the "reach" of the advertising campaign), increases the effectiveness of the advertising campaign. As used herein, the "number of impressions" indicates a total number of times an advertisement has been presented to users of an online system. For example, if 500 different users have seen the ad 3 times and 350 different users have seen the ad 4 times, the number of impressions for that ad would be (500)(3)+(350)(4)=2900. Additionally, as described above "reach" of an advertisement specifies a number of different users of an online system that have been presented with the advertisement. For example, if 500 different users have seen an advertisement 3 times and 350 different users have seen the advertisement 4 times, the reach of the advertisement is 850 users (500+350).

When specifying an advertising campaign, advertiser identifies different properties, or characteristics, of the advertising campaign. For example, the advertiser specifies a budget associated with an advertising campaign that specifies the total amount of compensation the advertiser is willing to provide an online system for presentation of advertisements in the advertising campaign. Additionally, a duration may be associated with the advertising campaign specifying a length of time during which advertisements from the advertising campaign are presented to online system users. The advertiser may also specify one or more objectives for the advertising campaign. For example an impression objective specifying a number of impressions of advertisements from the advertising campaign and a reach objective specifying a number of different users presented with an advertisement from the advertising campaign are associated with the advertising campaign. Additional objectives may also be associated with the advertising campaign, such as a frequency objective that specifies a number of times advertisements from the advertising campaign are presented to the same user of an online system.

Additionally, an advertiser may associate targeting criteria with an advertising campaign specifying one or more characteristics of users eligible to be presented with advertisements included in the advertising campaign. Bid amounts are associated with various advertisements in the advertising campaign that specify an amount of compensation an advertiser provides an online system for presenting an advertisement, for an online system user interacting with the advertisement, or for another specified criteria occurring. In various embodiments, bid amounts are determined for advertisements in the advertising campaign based on an objective and a duration associated with the advertising campaign.

If advertisements from the advertising campaign are presented without pacing, an online system, such as the social networking system 140, retrieves an advertisement from the advertising campaign associated with one or more targeting criteria satisfied by the characteristics of a user. The retrieved advertisement is included in an auction or other selection process along with other advertisements eligible for presentation to the user. If the advertisement is selected for presentation to the user, the advertiser associated with the advertisement is charged an amount based on the advertisement's associated bid amount and the bid amounts of other advertisements included in the auction or selection process. If a large number of users are eligible to be presented with advertisements in the advertising campaign, the advertising campaign's budget may be exhausted before the duration associated with the advertising campaign elapses. For example, an advertiser specifies a duration of an advertising campaign to be 10 days and an objective of the advertising campaign of 1 million impressions. If the campaign is not paced, the 1 million impressions may be achieved in less than the 10 days specified, resulting in no advertisements from the advertising campaign being presented during a portion of the duration. For example, if the objective of 1 million impressions is achieved in 5 days, no advertisements from the advertising campaign are presented during the last 5 days of the 10 day duration.

However, if pacing is applied to an advertising campaign, presentation of advertisements from the advertising campaign is modified over time so that the objective associated with the advertising campaign is met over the duration associated with the advertising campaign. For example, if the advertiser specifies a duration of an advertising campaign of 10 days and an objective of 1 million impressions for the advertising campaign, presentation of advertisements form the advertising campaign is modified during different days (or during other time intervals) so the 1 million impressions occur over the entire 10 day duration. In the preceding example, pacing presentation of advertisements in the advertising campaign may cause the social networking system 140 to evenly distribute the 1 million impressions across the 10 days, so 100,000 impressions of advertisements in the advertising campaign occur per day. However, in various embodiments, pacing may differently distribute impressions of advertisements in an advertising campaign; in some embodiments, the social networking system 140 uses various functions to determine distribution of impressions of advertisements throughout a duration of an advertising campaign. For example, the social networking system 140 uses a linear function, a sub-linear function or any other type of function to distribute impressions of advertisements throughout a duration associated with an advertising campaign.

In some embodiments, a different objective associated with an advertising campaign is used to pace presentation of advertisements in an advertising campaign throughout a duration. For example, the social networking system 140 may adjust an impression objective and/or a reach objective of the advertising campaign over various intervals of the duration, may adjust a budget of the advertising campaign used by different intervals, or adjust other objectives of the advertising campaign over various time intervals. Additionally, multiple objectives may be associated with an advertising campaign, and the social networking system 140 modifies presentation of advertisements during different time intervals of the duration to satisfy the multiple objectives throughout a duration associated with the ad campaign. For example, presentation of advertisements in an advertising campaign is paced by the social networking system 140 to satisfy an objective for a number of impressions, an objective for the reach of advertisements in the advertising campaign, and a budget of the advertising campaign over the duration.

To modify presentation of advertisements during various time intervals to pace presentation of the advertisement, an advertisement ("ad") auction prediction module 115 in the social networking system 140 determines a predicted number of auctions selecting an advertisement in which an advertisement from the advertising campaign is selected for presentation to a social networking system user. In an auction, advertisements are ranked by bid amounts associated with each advertisement, and advertisements having a highest bid amount or having a threshold position in the ranking are selected for presentation to a social networking system user. Advertisements from various advertising campaigns are typically included in an auction, so the likelihood of an advertisement from an advertising campaign being selected varies depending on the other advertisements included in the auction.

The ad auction prediction module 115 retrieves information from an ad auction store 105 describing previously completed ad auctions. For example, the ad auction store 105 includes information identifying an advertisement selected from a previously completed auction, a bid amount associated with the selected advertisement, an amount charged to an advertiser associated with the selected advertisement, targeting criteria associated with the selected advertisement, or other suitable information describing the selected advertisement. For example, based on information describing previously-completed ad auctions from the ad auction store, the ad auction prediction module 115 determines a predicted number of impression opportunities (Ii) of advertisements from the advertising campaign and a predicted amount of reach opportunities (Ri) of advertisements from the advertising campaign. Based on information about an advertising campaign (e.g., an associated budget, bid amounts associated with advertisements in the advertising campaign, etc.) and the information about previously completed ad auction, the ad auction prediction module 115 determines a predicted number of impressions (Ip) of advertisements in the advertising campaign by determining a number of previously completed auctions in which advertisements from the advertising campaign would have been selected using the advertising campaign's budget and bid amounts associated with advertisements in the advertising campaign and determines a predicted amount of reach (Rp) for advertisements in the advertising campaign based on previously completed auctions in which an ad would have been selected for presentation to a social networking system user not previously presented with an advertisement from the advertising campaign based on the advertising campaign's budget and bid amounts determined for advertisements in the advertising campaign based on the advertising campaign's budget, duration, and/or objectives.

The ad pace adjustment module 131 receives the predicted number of impressions and predicted amount of reach from the ad auction prediction module 115 and determines one or more scaling filters applied to opportunities to present advertisements from the advertising campaign. In one embodiment, the ad pace adjustment module 131 determines an impression scaling filter (If) and/or a reach scaling filter (Rf). The impression scaling filter and/or the reach scaling filter are applied to identified opportunities to present an advertisement to determine whether to identify an advertisement from the ad campaign for inclusion in an auction to be evaluated for presentation in an identified opportunity. The impression scaling filter (If) may be applied to each identified opportunity to present an advertisement to determine whether to include an ad from the advertising campaign in an auction for selecting an advertisement to present during the identified opportunity, while the reach scaling filter (Rf) is applied to each identified opportunity to present an ad to a user that has not previously been presented with an ad from the advertising campaign. The impression scaling filter (If) and/or the reach scaling filter (Rf) may specify a percentage of opportunities to present an advertisement or to present an advertisement to a user that has not previously been presented with an advertisement from the advertising campaign in which an advertisement from the advertising campaign is included in an auction for selection. For example, if an impression scaling filter (If) indicates that ads from the advertising campaign are included in 50% of auctions for presenting advertisements to social networking system users and a reach scaling filter (Rf) indicates that ads from the advertising campaign are included in 25% of auctions to present advertisements to users that have not previously been presented with ads from the advertising campaign, advertisements from the advertising campaign are included in, on average, half of the auctions for selecting ads for identified opportunities and, on average, in a quarter of auctions for selecting ads for presentation to a user that has not previously been presented with an advertisement from the advertising campaign.

The ad auction filtering module 133 receives the impression scaling filter (If) and the reach scaling filter (Rf) from the ad pace adjustment module 131, and determines whether to include an advertisement from the advertising campaign in an auction for presenting an advertisement when an opportunity to present an advertisement is identified. If the impression scaling filter and/or the reach scaling filter indicate that an ad from the advertising campaign is to be included in an auction for presentation based on the identified opportunity, the ad auction filtering module 133 identifies and advertisement from the advertising campaign and a bid amount determined for the identified advertisement based on the advertising campaign's budget, duration, and/or objective. For example, if the impression scaling filter indicates that advertisements from the advertising campaign are included in 25% of the auctions for presenting advertisements when an opportunity to present advertisements is identified, the ad auction filtering module 133 selects advertisements from the advertising campaign for one-quarter of the auctions for identified opportunities and does not select advertisements from the advertising campaign for the remaining three-quarters of the auctions for identified opportunities. A bid amount determined for the identified advertisement by the ad pace adjustment module 131 is retrieved and communicated to an ad auction module 120 along with the identified advertisement. The ad auction module 120 ranks various advertisements based on their associated bid amounts and selects advertisements for presentation via the identified opportunity based at least in part on the ranking.

To increase the likelihood of the advertising campaign satisfying one or more of its associated objectives over a specified duration, the ad auction module 120 communicates information describing whether an ad from the advertising campaign was selected in an auction to the ad performance determination module 135. Information from the ad auction module 120 indicates whether an ad from the advertising campaign was selected in an auction (allowing tracking of the number of impressions of advertisements), whether the ad from the advertising campaign was selected for presentation to a user that had not previously been presented with an ad from the advertising campaign (allowing tracking of the amount of reach of advertisements from the advertising campaign), the amount charged by the social networking system 140 to an advertiser if an ad from the advertising campaign was selected, or other suitable information. Hence, the ad performance determination module 135 may determine the current impression performance (Ig) and/or the current reach performance (Rg) of advertisements from the advertising campaign based on information from the ad auction module 120. The ad performance determination module 135 communicates the current impression performance, the current reach performance, or other information describing performance of advertisements from the advertising campaign to the ad pace adjustment module 131, allowing modification of the impression scaling filter (If) and/or the reach scaling filter (Rf) based on performance of advertisements from the advertising campaign in various auctions. Additionally, the ad performance determination module 135 may include the initial objective, or objectives, associated with the advertising campaign, as well as information describing performance of the advertising campaign over various time intervals.

For example, an advertising campaign has an objective of 1 million impressions, a reach objective of 100,000 discrete users, a budget of $10 million, and a duration of 10 days. Based on the duration and the objectives, the ad performance determination module 135 determines one or more objectives associated with a portion of the duration. For example, the ad performance determination module 135 determines that after one of the ten days, there should be an objective of 100,000 impressions for the day and a reach of 30,000 different users for the day. Additionally, the ad performance determination module may also allocate $1 million of the $10 million budget for the day, resulting in average price per impression of $10 to achieve the objectives for the day.

The ad auction prediction module 115 retrieves information from the ad auction store 105 describing previously completed auctions associated with a specified time period (e.g., auctions completed during the past day) and determines that, during the specified time period, 1 million different users access the social networking system 140, each user generating an average of 10 opportunities to present advertisements (i.e., on average, each user accessed the social networking system 140 ten times during the specified time period), resulting in 10 million opportunities to present advertisements (i.e., $Ri=1,000,000$ and $Ii=10,000,000$) based on the number of previously completed auctions. Additionally, the ad auction prediction module 115 determines an average price per impression of $10 and that advertisements from the advertising campaign would be selected in auctions for 500,000 of the opportunities to present advertisements ($Ip=500,000$), which presents advertisements from the ad campaign to 100,000 different users ($Rp=100,000$) from previously completed auctions. Hence, in this example, advertisements from the advertising campaign are selected in 5% of the auctions for presentation to 10% of the users.

Based on the number of auctions in which advertisements from the advertising campaign were predicted to be selected and the number of different users to which ads from the advertising campaign were predicted to be presented, the ad pace adjustment module 131 determines an impression scaling filter and a reach scaling filter. The impression scaling filter limits the number of auctions for opportunities to present an advertisement in which ads from the advertising campaign are included, while the reach scaling filter limits the number of auctions for opportunities to present advertisements to users that have not previously been presented with an advertisement from the advertising campaign in which ads from the advertising campaign are included. In the preceding example, to limit impressions of ads from the impression objective for a day of 100,000 impressions and to achieve the reach objective of 30,000 different users for the day, ads from the advertising campaign are included in ⅕ of the auctions to present advertisements in an identified impression (If=0.2) and are included in 3/10 of the auctions to present advertisements to users that have not previously been presented with an advertisement from the advertising campaign (Rf=0.3).

When auctions to present advertisements based identified opportunities to present advertisements are generated, advertisements from the advertising campaign are included in the auctions based on the impression scaling filter (If) and the reach scaling filter (Rf). After identifying an opportunity to present an ad to a social networking system user, the ad auction filtering module 133 uses the impression scaling filter and/or the reach scaling filter to determine whether to include an advertisement from the advertising campaign in an auction for the identified opportunity. For example, if the impression scaling filter is 0.2, an advertisement from the advertising campaign has a 20% probability of being included in an auction for an opportunity to present an advertisement. In the preceding example, if 1 million different users access the social networking system 140, generating 10 million opportunities to present advertisements, the ad auction filtering module 133 includes advertisements from the advertising campaign in auctions for presenting advertisements to (1 million)(Rf)=(1 million)(0.3)=300,000 different users and in auctions for (10 million)(If)=(10 million)(0.2)=2 million of the opportunities to present advertisements. Based on the prediction that ads from the ad campaign win 5% of the auctions for 10% of the users, ads from the advertising campaign would be selected in 100,000 auctions for 30,000 different users, achieving the daily objectives of the advertising campaign.

System Architecture

Figure 2:
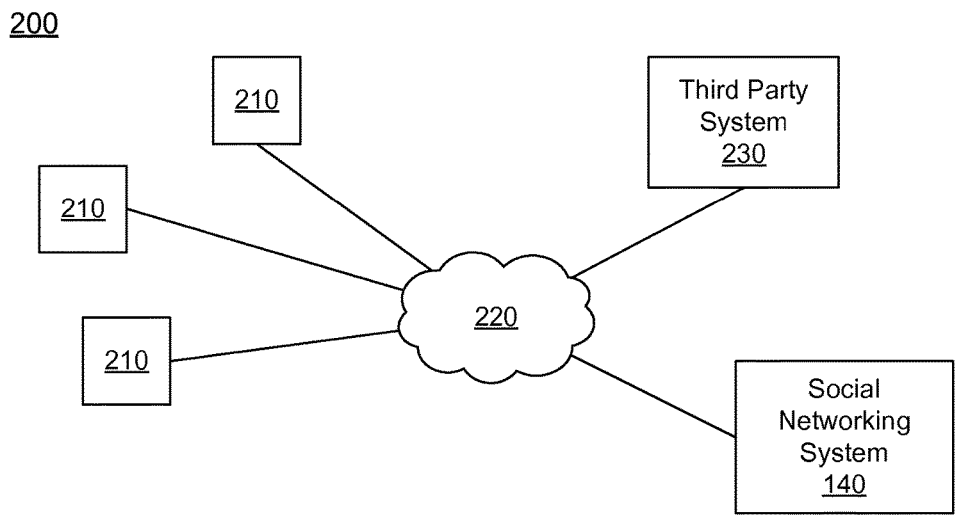
FIG. 2 is a block diagram of a system environment in which a social networking system operates, in accordance with an embodiment.

FIG. 2 is a block diagram of a system environment 200 for a social networking system 140. The system environment 200 shown by FIG. 2 comprises one or more client devices 210, a network 220, one or more third-party systems 230, and the social networking system 140. In alternative configurations, different and/or additional components may be included in the system environment 200. Further, the embodiments described herein can be adapted to online systems that are not social networking systems.

The client devices 210 are one or more computing devices capable of receiving user input as well as transmitting and/or receiving data via the network 220. In one embodiment, a client device 210 is a conventional computer system, such as a desktop or a laptop computer. Alternatively, a client device 210 may be a device having computer functionality, such as a personal digital assistant (PDA), a mobile telephone, a smartphone or another suitable device. A client device 210 is configured to communicate via the network 220. In one embodiment, a client device 210 executes an application allowing a user of the client device 210 to interact with the social networking system 140. For example, a client device 110 executes a browser application to enable interaction between the client device 210 and the social networking system 140 via the network 220. In another embodiment, a client device 210 interacts with the social networking system 140 through an application programming interface (API) running on a native operating system of the client device 210, such as IOS® or ANDROID™.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 230 may be coupled to the network 220 for communicating with the social networking system 140, which is further described below in conjunction with FIG. 3. In one embodiment, a third party system 230 is an application provider communicating information describing applications for execution by a client device 210 or communicating data to client devices 210 for use by an application executing on the client device. In other embodiments, a third party system 230 provides content or other information for presentation via a client device 210. A third party system 230 may also communicate information to the social networking system 140, such as advertisements, content, or information about an application provided by the third party system 230.

Figure 3:
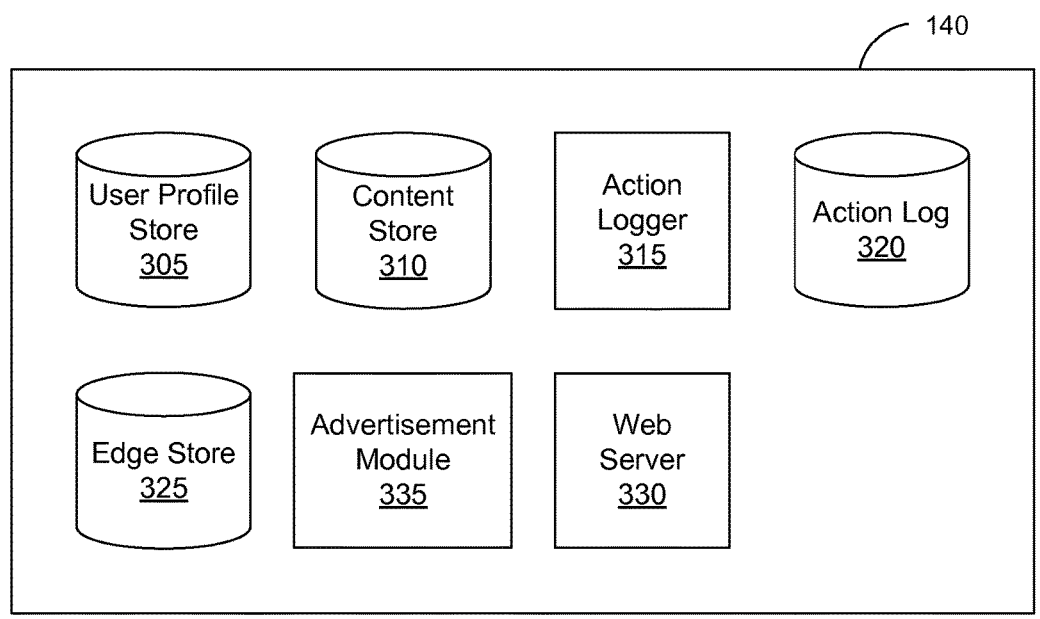
FIG. 3 is a block diagram of a social networking system, in accordance with an embodiment.

FIG. 3 is a block diagram of an architecture of the social networking system 140. The social networking system 140 shown in FIG. 3 includes a user profile store 305, a content store 310, an action logger 315, an action log 320, an edge store 325, an advertisement ("ad") module 335, and a web server 330. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 305. A user profile includes declarative information about the user that was explicitly shared by the user and may also include profile information inferred by the social networking system 140. In one embodiment, a user profile includes multiple data fields, each describing one or more attributes of the corresponding social networking system user2. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system 2 users displayed in an image. A user profile in the user profile store 305 may also maintain references to actions by the corresponding user performed on content items in the content store 310 and stored in the action log 320.

While user profiles in the user profile store 305 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 310 stores objects in which each object may represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 310, such as status updates, photos tagged by users to be associated with other objects in the social networking system, events, groups or applications. In some embodiments, objects are received from third-party applications or third-party applications separate from the social networking system 140. In one embodiment, objects in the content store 310 represent single pieces of content, or content "items." Hence, 2 social networking system users are encouraged to communicate with each other by posting text and content items of various types of media to the social networking system 140 through various communication channels. This increases the amount of interaction of users with each other and increases the frequency with which users interact within the social networking system 140.

The action logger 315 receives communications about user actions internal to and/or external to the social networking system 140, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 320.

The action log 320 may be used by the social networking system 140 to track user actions on the social networking system 140, as well as actions on third party systems 230 that communicate information to the social networking system 140. Users may interact with various objects on the social networking system 140, and information describing these interactions is stored in the action log 320. Examples of interactions with objects include: commenting on posts, sharing links, checking-in to physical locations via a mobile device, accessing content items, and any other suitable interactions. Additional examples of interactions with objects on the social networking system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the social networking system 140 as well as with other applications operating on the social networking system 140. In some embodiments, data from the action log 320 is used to infer interests or preferences of a user, augmenting the interests included in the user's user profile and allowing a more complete understanding of user preferences.

The action log 320 may also store user actions taken on a third party system 230, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 320 may record information about actions users perform on a third party system 230, including webpage viewing histories, advertisements that were engaged, purchases made, and other patterns from shopping and buying.

In one embodiment, the edge store 325 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

Figure 4:
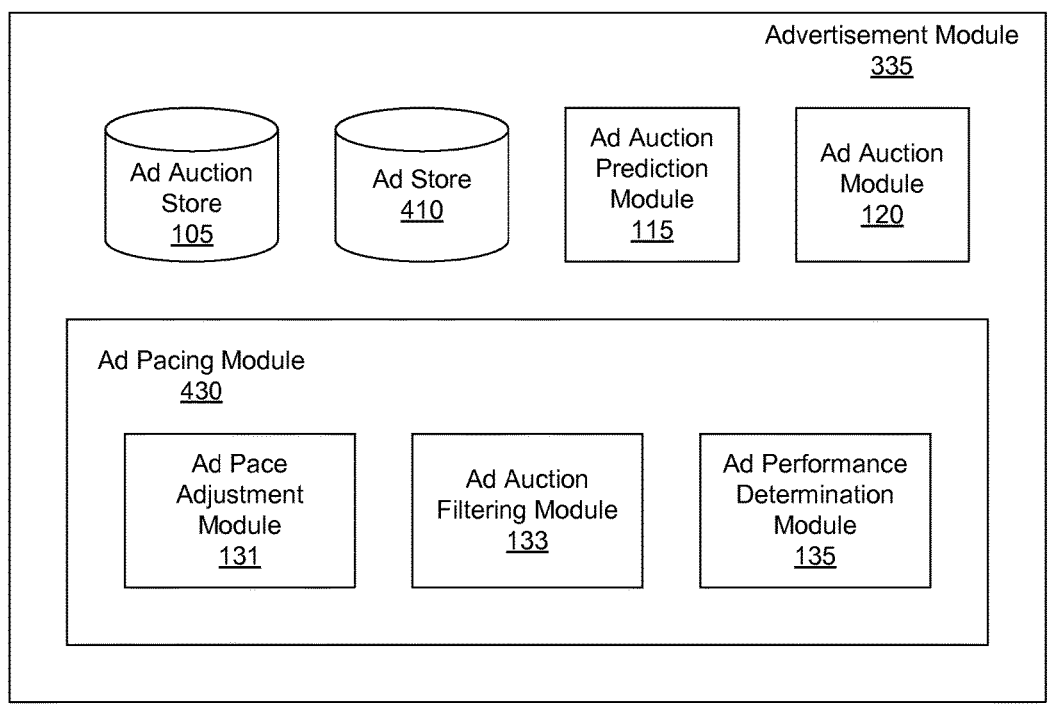
FIG. 4 is a block diagram of an advertisement module, in accordance with an embodiment.

The ad module 335 is described with reference to FIG. 4, which is a block diagram of one embodiment of the ad module 335. In the example shown by FIG. 4, the ad module 335 includes the ad auction store 105, an advertisement ("ad") store 410, the ad auction module 120, and an ad pacing module 430. The ad module 335 stores information describing advertisement ("ad") campaigns received from one or more advertisers. Each advertising campaign includes one or more advertisements described by ad requests, with information describing an advertising campaign and its constituent advertisements included in the ad store 410.

An advertising campaign is associated with one or more objectives, a duration, and a budget. As described above in conjunction with FIG. 1, an objective associated with an advertising campaign describes one or more goals for actions associated with the advertising campaign. For example, an objective specifies a total number of impressions of advertisements in the advertising campaign to social networking system users (an "impression objective"), specifies a total number of unique social networking system users to be presented with at least one advertisement from the advertising campaign (a "reach objective"), a number of times an advertisement from the advertising campaign is presented to a social networking system user (a "frequency objective"), or any other suitable criteria. The budget specifies a total amount of compensation an advertiser associated with an advertising campaign provides the social networking system 140 for presenting advertisements in the advertising campaign or for the social networking system 140 receiving interactions with advertisements in the advertising campaign. Additionally, the duration associated with the advertising campaign specifies a time interval during which advertisements from the advertising campaign are presented to social networking system users. For example, if the duration of an advertising campaign is 30 days, advertisements included in the advertising campaign are presented to social networking system users for 30 days after the advertising campaign is provided to the social networking system 140. In some embodiments, the advertiser may also specify a start date for the advertising campaign, so the duration is measured from the specified start date.

An advertising campaign includes one or more ad requests that each describe advertisements in the advertising campaign for presentation to one or more social networking system users. An ad request includes advertisement content, which is text, image, audio, video, or any other suitable data presented to a user. In various embodiments, the advertisement content is associated with a network address specifying a landing page, or other destination, to which a user is directed when the advertisement is accessed. An ad request also associates a bid amount with an advertisement. In some embodiments, the bid amount is specified by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed.

Alternatively, the advertiser does not associate a bid amount with the ad request, but the social networking system 140 determines a bid amount for the ad request based on a budget, a duration, and/or an objective associated with the advertising campaign including the ad request. For example, a pacing factor is determined from the budget associated with an advertising campaign and an amount spent by an advertiser on the advertising campaign from a start date of the advertising campaign to a current time. The pacing factor modifies a bid amount associated with various advertisements in the ad campaign to modify how the advertising campaign's budget is spent throughout the duration of the advertising campaign.

Additionally, an ad request may include one or more targeting criteria specified by the advertiser. Targeting criteria included in an ad request specify one or more characteristics of users eligible to be presented with advertisement content associated with the ad request. For example, targeting criteria are used to identify users having user profile information, edges or actions satisfying at least one of the targeting criteria. Hence, targeting criteria allow an advertiser to identify users having specific characteristics, simplifying subsequent distribution of ad content to different users. Additionally, targeting criteria may be associated with an advertising campaign in its entirety, so multiple advertisements in the advertising campaign are eligible to users having characteristics satisfying one or more of the targeting criteria associated with the advertising campaign.

In one embodiment, targeting criteria may specify actions or types of connections between a user and another user or object of the social networking system 140. Targeting criteria may also specify interactions between a user and objects performed external to the social networking system 140, such as on a third party system 230. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 230, or any other suitable action. Including actions in targeting criteria allows advertisers to further refine users eligible to be presented with ad content in an ad request that includes the targeting criteria. As another example, targeting criteria identifies users having a connection to another user or object or having a particular type of connection to another user or object.

As described above in conjunction with FIG. 1, the ad auction store 105 includes information describing previously completed auctions where one or more advertisements were selected. For example, the ad auction store 105 includes information identifying an advertisement selected from a previously completed auction, a bid amount associated with the selected advertisement, an amount charged to an advertiser associated with the selected advertisement, targeting criteria associated with the selected advertisement, or other suitable information describing the selected advertisement. In some embodiments, the ad auction store 105 additionally stores information regarding the advertisers associated with ads included in a previously completed auction and bid amounts associated with advertisements included in the previously completed auction, as well as information identifying a user to whom an advertisement selected from the previously completed auction was presented.

The ad auction prediction module 115 retrieves information from the ad auction store 105 describing previously completed auctions in which one or more advertisements were selected. In an auction, advertisements are ranked by bid amounts associated with each advertisement, and advertisements having a highest bid amount or having a threshold position in the ranking are selected for presentation to a social networking system user. Advertisements from various advertising campaigns are typically included in an auction, so the likelihood of an advertisement from an advertising campaign being selected varies depending on the other advertisements included in the auction. For example, the ad auction prediction module 115 retrieves information from the ad auction store 105 describing auctions occurring within a time interval (e.g., one day) to estimate a number of impressions of advertisements from an advertising campaign and/or to estimate a number of different social networking system users to be presented with an advertisement from the advertising campaign during a subsequent time interval of the same duration as the time interval.

Information retrieved from the ad auction store 105 may account for targeting criteria associated with advertisements in the advertising campaign or associated with the advertising campaign to identify previously completed auctions including advertisements with similar or matching targeting criteria. In some embodiments, the ad auction prediction module 115 determines the number of opportunities to present an advertisement and/or the number of opportunities to present an advertisement to a social networking system user that has not previously been presented with an advertisement from the advertising campaign over various time intervals and determines an average. For example, the ad auction prediction module 115 determines the number of opportunities to present an advertisement to a social networking system user during each of the 10 days preceding a current date and determines an average value from the 10 days.

In some embodiments, the ad auction prediction module 115 determines the number of opportunities to present an advertisement or opportunities to present an advertisement to a social networking system user not previously presented with an advertisement from the ad campaign based on previously completed auctions during time periods having a common characteristic with a current time period. For example, if advertisements from an advertising campaign are to be presented on a Monday, the ad auction prediction module 115 determines the number of opportunities to present advertisements based on auctions previously completed on one or more prior Mondays. Example characteristics of a time period include: a day of the week, a month, a year, a holiday within a threshold time of a current time, or other similar data.

Based on the previously completed auctions retrieved from the ad auction store 105, the ad auction prediction module 115 determines whether an advertisement from the advertising campaign would have been selected in each of the retrieved previously completed auctions based on the advertising campaign's budget and/or bid amounts determined for advertisements in the advertising campaign based on the advertising campaign's budget, objective, and/or duration. In one embodiment, the ad auction prediction module 115 determines whether a bid amount determined for an advertisement in the advertising campaign exceeded the bid amount associated with a bid selected from a previously completed auction (e.g., exceeded a maximum bid amount in the previously completed auction, exceeded a bid amount associated with an advertisement having at least a threshold position in a ranking from the previously completed auction, etc.). Based on the budget associated with the advertising campaign and the previously-completed auctions, the ad auction prediction module 115 determines the total number of opportunities to present advertisements in which an advertisement from the advertising campaign would have been selected in a previously completed auction.

In one embodiment, the ad auction prediction module 115 also determines a number of opportunities to present advertisements corresponding to auctions in which an advertisement was selected for presentation to a user that had not previously been presented with an advertisement from an advertising campaign. This allows the ad auction prediction module 115 to identify a number of opportunities to present an advertisement to a user not previously presented with an advertisement. A number of the identified opportunities in which an advertisement from the advertising campaign would have been selected may then be determined to identify an estimated number of opportunities to present an advertisement from the advertising campaign to a user not previously presented with an advertisement from the advertising campaign.

The ad auction module 120 receives advertisements from one or more advertising campaigns and ranks the received advertisements based on their associated bid amounts when an opportunity to present an advertisement is identified. For example, the ad auction module 120 ranks the received advertisements based on their associated expected values, which are based at least in part on advertisements' bid amounts, where advertisements associated with larger expected values have a higher position in the ranking. The ad auction module 120 selects one or more advertisements based on the ranking, and the selected advertisements are presented to a social networking system user. For example, the ad auction module 120 selects advertisements having the highest position in the ranking or having at least a threshold position in the ranking. In other embodiments, the auction module 120 may use any other suitable method to select advertisements for presentation to a social networking system user.

The ad pacing module 430 regulates presentation of advertisements from an advertising campaign to social networking system users so that an objective associated with the advertising campaign is satisfied throughout a duration associated with the advertising campaign. In the example of FIG. 4, the ad pacing module 430 includes the ad pace adjustment module 131, the ad auction filtering module 133, and the ad performance determination module 135.

The ad pace adjustment module 131 receives the predicted number of impressions and predicted amount of reach from the ad auction prediction module 115 and determines a scaling filter applied to auctions for opportunities to present advertisements from the advertising campaign. In one embodiment, the ad pace adjustment module 131 determines an impression scaling filter (If) and/or a reach scaling filter (Rf). The impression scaling filter and/or the reach scaling filter are applied to subsequently identified opportunities to present an advertisement to determine whether to identify an advertisement from the ad campaign for inclusion in an auction to be evaluated for presentation in an identified opportunity. Determination of an impression scaling filter (If) and a reach scaling filter (Rf) is further described below in conjunction with FIG. 5.

In one embodiment, the ad pace adjustment module 131 determines a pacing factor that determines bid amounts associated with advertisements from an advertising campaign during an interval of the advertising campaign's duration. For example, the ad pace adjustment module 131 determines a pacing factor from the budget associated with an advertising campaign and an amount spent by an advertiser on the advertising campaign from a start date of the advertising campaign to a current time. The ad pace adjustment module 131 modifies the bid amount associated with one or more advertisements in the advertising campaign based on the pacing factor. For example, bid amounts associated with one or more advertisements in the advertising campaign are multiplied by the pacing factor, with the product used as the bid amounts associated with the advertisements during an interval of the advertising campaign's duration. The pacing factor may be modified at various intervals, allowing the ad pace adjustment module 131 to modify how the advertising campaign's budget is used throughout the advertising campaign's duration.

As described above in conjunction with FIG. 1, the ad auction filtering module 133 receives the impression scaling filter and the reach scaling filter from the ad pace adjustment module 131 and identifies opportunities to present advertisements to social networking system users. The ad auction filtering module 133 applies the impression scaling filter and/or the reach scaling filter to the identified opportunities to present an advertisement to determine whether to include an advertisement from the advertising campaign in an auction for an identified opportunity. For example, if an impression scaling filter of 10% indicates that advertisements from the advertising campaign are retrieved from the ad store 410 for inclusion in one out of ten auctions for identified opportunities to present advertisements to social networking system users. Similarly, a reach scaling filter of 33.33% indicates that ads from the advertising campaign are retrieved from the ad store 410 for inclusion in one out of three auctions for opportunities to present advertisements to users not previously presented with at least one advertisement from the advertising campaign. In some embodiments, the ad auction filtering module 133 generates a random number (e.g., a random number from 0 to 1) and determines whether to include an advertisement from the advertising campaign in an auction if the number is less than a value of a scaling filter. For example, if a scaling filter is 25%, the ad auction filtering module 133 selects an advertisement from the advertising campaign in an auction if the generated random number is below 0.25. Thus, the impression filter and/or the reach filter regulate the number of auctions for opportunities to present advertisements to social networking system users that include advertisements from the advertising campaign.

In some embodiments, the ad auction filtering module 133 determines whether an opportunity to present an advertisement is for a user that has not previously been presented with an advertisement from the advertising campaign. If the opportunity is to present an advertisement to a user that has not previously been presented with an advertisement from the advertising campaign, the ad auction filtering module 133 uses a reach scaling filter to determine if to include an advertisement from the advertisement campaign into an auction for the opportunity. However, if the new ad opportunity is to present an advertisement to a user that has previously been presented with an advertisement from the advertising campaign, the ad auction filtering module uses an impression scaling filter to determine if to include an advertisement from the advertisement campaign into an auction for the opportunity.

The ad performance determination module 135 determines an objective for the advertising campaign during an interval that is a portion of the duration associated with the advertising campaign. For example, the ad performance determination module 135 identifies a portion of one or more objectives associated with an advertising campaign that remain incomplete and a portion of the duration of the advertising campaign that has not lapsed and allocates the portion of the one or more objectives across the portion of the advertising campaign's duration that has not lapsed. Additionally, based on information received from the ad auction module 120 the ad performance determination module 135 may determine a current performance of the advertising campaign relative to an objective for an interval. Based on a difference between the current performance of the advertising campaign and the objective for the interval, the ad performance determination module 135 determines an interval reach objective and an interval impression objective for the advertising campaign. The determined interval objectives specify a number of impressions or an amount of reach for the advertising campaign during an interval of the advertising campaign's duration. For example, the ad performance determination module 135 determines the current performance of the advertising campaign based on auctions for opportunities to present advertisements in which an advertisement from the advertising campaign was selected. Based on a difference between the current performance of the advertising campaign and an interval objective, the ad performance determination module 135 communicate information to the ad pace adjustment module 131 to modify one or more scaling filters.

The web server 330 links the social networking system 140 via the network 220 to the one or more client devices 210, as well as to the one or more third party systems 230. The web server 330 serves web pages, as well as other content, such as JAVA®, FLASH®, XML and so forth. The web server 330 may receive and route messages between the social networking system 140 and the client device 210, for example, instant messages, queued messages (e.g., email), text messages, short message service (SMS) messages, or messages sent using any other suitable messaging technique. A user may send a request to the web server 330 to upload information (e.g., images or videos) that are stored in the content store 310. Additionally, the web server 330 may provide application programming interface (API) functionality to send data directly to native client device operating systems, such as IOS®, ANDROID™, WEBOS® or BlackberryOS.

Reach and Frequency Pacing

Figure 5:
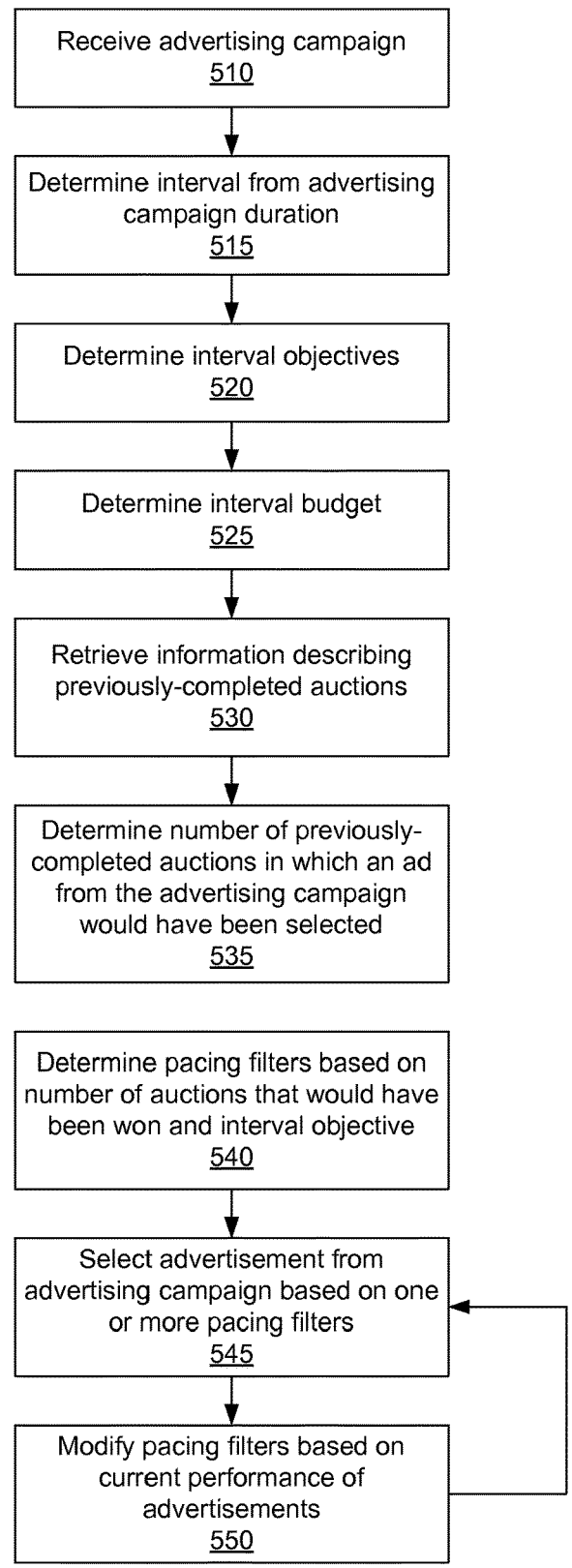
FIG. 5 is a flow diagram of a method for determining one or more scaling filters for pacing an advertising campaign, in accordance with an embodiment.

FIG. 5 is a flowchart of a method for determining one or more scaling filters for pacing presentation of advertisements from an advertising ("ad") campaign. In various embodiments, the steps described in conjunction with FIG. 5 may be performed in different orders. Additionally, different and/or additional steps than those described in conjunction with FIG. 5 may be performed in some embodiments.

The social networking system 140 receives 510 an advertising campaign including one or more advertisements for presentation to social networking system users. The advertising campaign is associated with a duration, one or more objectives, and a budget. As described above in conjunction with FIGS. 1 and 4, the objective describes one or more goals for actions associated with the advertising campaign. For example, the objective specifies a total number of impressions of advertisements in the advertising campaign to social networking system users (an "impression objective"), specifies a total number of unique social networking system users to be presented with at least one advertisement from the advertising campaign (a "reach objective"), specifies a number of times an advertisement from the advertising campaign is presented to a social networking system user (a "frequency objective"), or specifies any other suitable criteria. The duration specifies a length of time during which advertisements from the advertising campaign are presented by the social networking system 140, and the budget specifies an amount of compensation an advertiser associated with the advertising campaign will provide the social networking system 140 for presenting advertisements in the advertising campaign.

An interval specifying a portion of the advertising campaign's duration is determined 515. For example, if the advertising campaign has a duration of 10 days, the determined interval is one day. The interval may be determined 515 based on information received from an advertiser along with the advertising campaign or may be determined 515 based on additional advertising campaigns received by the social networking system 140.

Based on the interval, the social networking system 140 determines 520 one or more interval objectives and determines 525 an interval budget for the advertising campaign. An interval objective specifies a portion of the objective associated with the advertising campaign for completion during the interval; for example, if the advertising campaign has an objective of 10,000 impressions over a 10-day duration and a determined interval of one day, the interval objective specifies a fraction of the 10,000 impressions to occur in one day. In some embodiments, multiple interval objectives may be determined 520, such as an interval objective for total impressions (an "interval impression goal") and an interval objective for a number of unique users presented with an advertisement form the advertising campaign (an "interval reach goal"). An interval impression objective may be determined 520 based on a number of impressions remaining in an objective of the advertising campaign and an amount of time remaining in the advertising campaign's duration. Similarly, an interval reach objective may be determined 520 based on a number of unique users remaining in an advertising campaign's objective and an amount of time remaining in the advertising campaign's duration. Similarly, the interval budget specifies a portion of the advertising campaign's budget for use during the interval.

In the preceding example, the interval budget represents a portion of the advertising campaign's budget for use during the one day interval. The interval budget may be determined based on the advertising campaign's budget and an amount received by the social networking system 140 from an advertiser at a current time for presentation of one or more advertisements from the advertising campaign. Based on a difference between the budget and the amount received, the interval budget is determined 525. In one embodiment, a pacing factor is determined based on the interval budget and used to modify the bid amounts associated with advertisements in the advertising campaign during the interval, as described above in conjunction with FIG. 4.

The social networking system determines a performance of the advertising campaign during the interval, where the performance identifies a predicted number of impressions of advertisements from the advertising campaign during the interval and identifies a predicted amount of reach of the advertising campaign during the interval. For example, the social networking system retrieves 530 information describing previously completed auctions in which one or more advertisements were selected for presentation to social networking system users. The retrieved information may identify previously completed auctions that occurred over a length of time matching the interval determined from the advertising campaign's duration. Additionally, information describing previously completed auctions may identify previously completed auctions including advertisements with targeting criteria matching or similar to targeting criteria associated with advertisements in the advertising campaign or associated with the advertising campaign. A number of the identified previously completed auctions may also be determined, providing an indication of a total number of opportunities to present advertisements to social networking system users corresponding to the previously completed auctions.

Based on the interval budget and the information describing previously completed auctions, a number of previously completed auctions in which an advertisement from the advertising campaign would have been selected is determined 535. For example, the social networking system 140 determines whether an advertisement from the advertising campaign would have been selected in each of the retrieved previously completed auctions based on the advertising campaign's budget, interval budget and/or bid amounts determined for advertisements in the advertising campaign based on the advertising campaign's budget, duration, and/or objective. For example, the social networking system 140 identifies a number of auctions in which a bid amount determined for an advertisement in the advertising campaign exceeds the bid amount associated with a bid selected from a previously completed auction (e.g., exceeded a maximum bid amount in the previously completed auction, exceeded a bid amount associated with an advertisement having at least a threshold position in a ranking from the previously completed auction, etc.). Additionally, the social networking system 140 decreases the interval budget by an estimated amount charged to the advertiser if an advertisement from the advertising campaign would have been selected in a previously completed auction, allowing the determined 535 number of previously completed auctions to account for the budget allocated for use during the interval. Hence, the determined number of previously completed auctions represents the number of previously completed auctions in which an advertisement from the advertising campaign would have been selected subject to the interval budget for presenting advertisements during the interval.

Based on the determined interval objectives and determined performance of the advertising campaign based on the number of previously completed auctions in which an advertisement from the advertising campaign would have been selected, the social networking system determines 540 one or more scaling filters. As described above in conjunction with FIGS. 1 and 4, a scaling filter regulates a number of auctions for identified opportunities to present advertisements to social networking system users that include advertisements from the advertising campaign. In various embodiments, a scaling filter is a ratio of an interval objective to a number of previously completed auctions in which an advertisement from the advertising campaign would have been selected. For example, an impression scaling filter is a ratio of a desired number of impressions during a time interval to a predicted number of impressions during the time interval, which may be based at least in part on a number of previously completed auctions during a matching time interval in which advertisements from the advertising campaign would have been selected. As another example, a reach scaling filter is a ratio of a desired number of unique users presented with an advertisement from the advertising campaign to a predicted number of unique users presented with an advertisement from the advertising campaign during an interval, which may be based at least in part on a number of previously completed auctions for discrete users during a matching time interval in which advertisements from the advertising campaign would have been selected.

When an opportunity to present an advertisement to a social networking system user is identified, the social networking system 140 selects 545 an advertisement from the advertising campaign for inclusion in an auction associated with the opportunity based on one or more of the scaling filters. For example, an impression scaling filter specifies a percentage of auctions for opportunities to present an advertisement in which an advertisement from the advertising campaign is included. As another example, a reach scaling filter specifies a percentage of auctions for opportunities to present an advertisement to users not previously presented with at least one advertisement from the advertising campaign in which an advertisement from the advertising campaign is included.

As advertisements from the advertising campaign are selected in auctions for identified opportunities to present advertisements, one or more of the scaling filters may be modified 550. For example, based on a difference between current performance of advertisements from the advertising campaign in auctions (e.g., a number of advertisements from the advertising campaign selected in auctions for identified opportunities to present advertisements to social networking system users), a scaling filter may be increased or decreased to, respectively, increase or decrease the number of auctions for identified opportunities to present advertisements that include advertisements from the advertising campaign. Alternatively, one or more of the scaling filters may be modified 550 at specified time intervals (e.g., daily) or after any other suitable criteria (e.g., a specified number of impressions, a specified number of opportunities to present advertisements, etc.). This allows the social networking system 140 to adjust one or more scaling filters during an interval to increase the likelihood of satisfying the interval objective for the advertising campaign.

Figure 6:
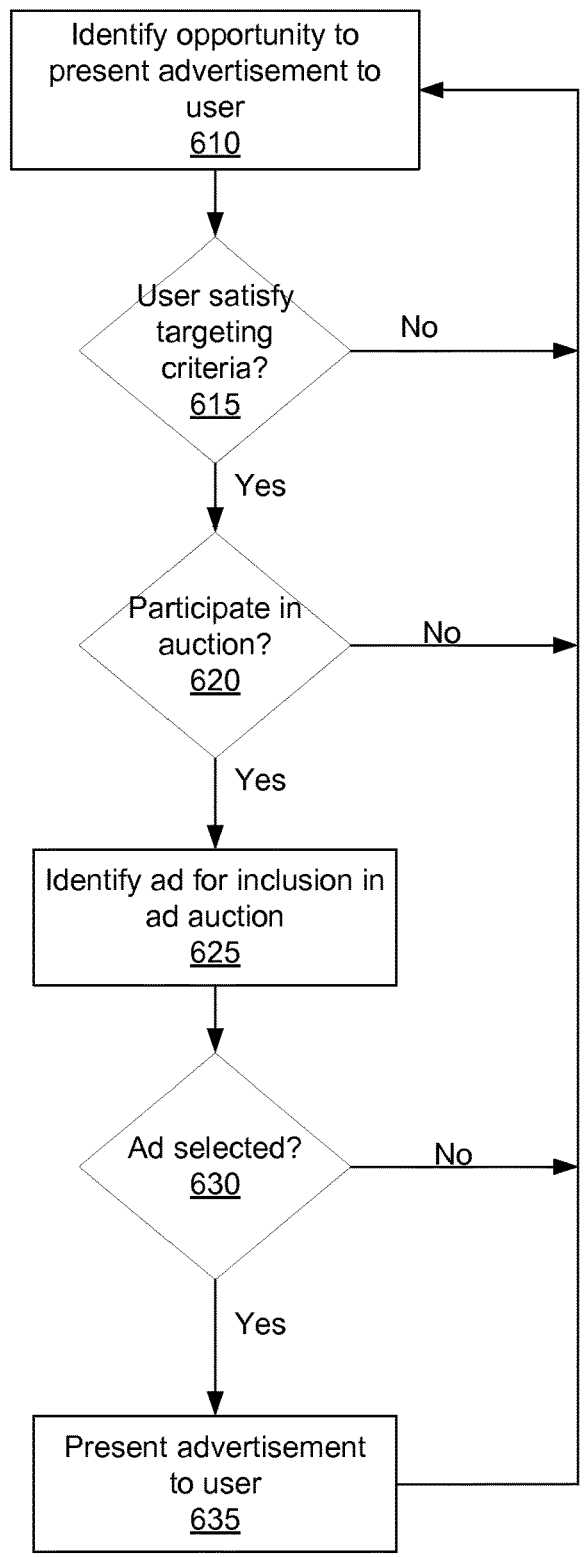
FIG. 6 is a flow diagram of a method for pacing an advertising campaign, in accordance with an embodiment.

FIG. 6 is a flow diagram of a method for pacing presentation of advertisements from an advertising campaign. In various embodiments, the method may include different and/or additional steps than those described in conjunction with FIG. 6. The social networking system 140 identifies 610 an opportunity to present an advertisement to a social networking system user. For example, the social networking system 140 receives a request from a client device 110 to present one or more advertisements to a social networking system user associated with the client device 110.

The social networking system 140 retrieves information associated with the user by the social networking system 140 and determines 615 if the user satisfies one or more targeting criteria associated with an advertisement campaign or satisfies one or more targeting criteria associated with an advertisement in the advertising campaign. If the social networking system 140 determines 615 that characteristics associated with the user do not satisfy at least one targeting criteria, no action is performed until the social networking system 140 identifies 610 another request to present an advertisement. However, if the social networking system 140 determines 615 characteristics associated with the user satisfy at least one targeting criteria, the social networking system 140 retrieves one or more scaling filters associated with the advertising campaign and determines 620 whether to include one or more advertisements from the advertising campaign in an auction associated with the identified opportunity based at least in part on the one or more scaling filters, as described above in conjunction with FIGS. 1 and 4.

If the social networking system determines 620 to include one or more advertisements in the auction associated with the opportunity, the social networking system 140 identifies 625 one or more advertisements from the advertising campaign for inclusion in the auction. However, if the social networking system 140 determines 620 not to include one or more advertisements from the advertising campaign in the auction, no action is performed until another opportunity to present one or more advertisements is identified 610.

Based at least in part on bid amounts associated with advertisements included in the auction, the social networking system 140 selects 630 one or more advertisements for presentation to the social networking system user based on the identified opportunity. If an advertisement from the advertising campaign is selected 630 via the auction, the advertisement is presented 635 to the user. For example, if the advertisement identified 625 from the advertising campaign has at least at threshold position in a ranking determined by the auction, has a maximum bid amount of advertisements in the auction, or has at least a threshold bid amount, the identified advertisement is selected 630 and is presented 635 to the user. If the advertisement identified 625 from the advertising campaign is not selected 630 via the auction, no action is performed until another opportunity to present an advertisement is identified 610.

Figure 7A:
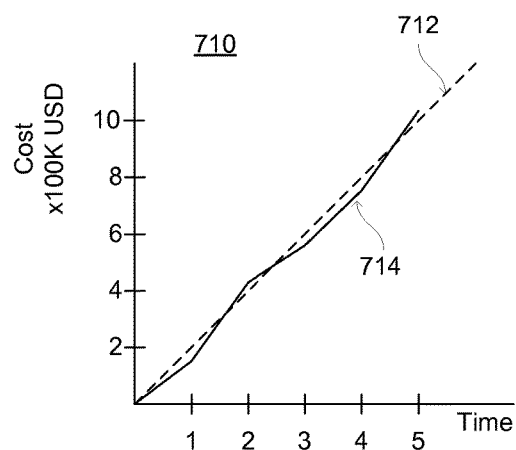
FIGS. 7A-7C are examples illustrating objectives of an advertising campaign and performance of the advertising campaign, in accordance with an embodiment.
Figure 7C:
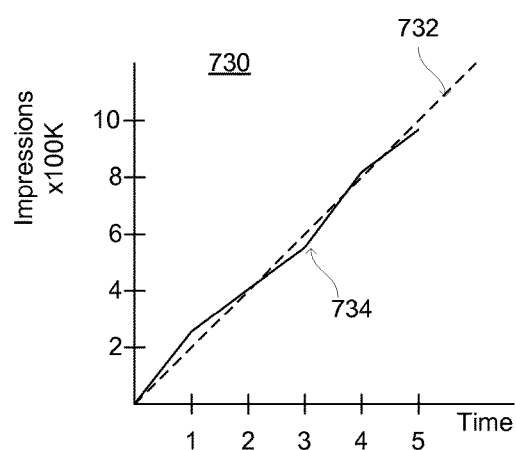
Figure 7B:
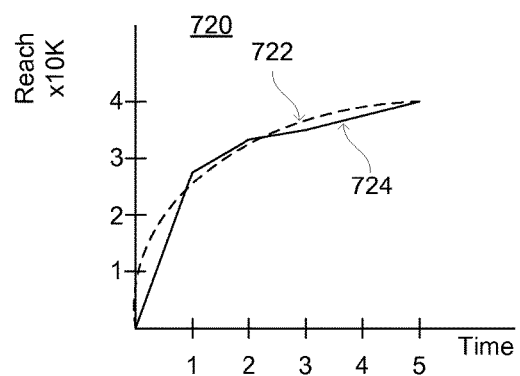

FIGS. 7A-7C illustrating objectives of an advertising campaign and performance of the advertising campaign. In FIG. 7A, the budget expended 710 over time on the advertising campaign, is depicted, while in FIG. 7B the the number of unique users 720 ("reach") presented with advertisements from the advertising campaign over time is shown. FIG. 7C illustrates a total number of impressions 730 of advertisements from the advertising campaign are illustrated. FIG. 7A shows a budget function 712 over time in conjunction with a current budget 714, and FIG. 7B shows a reach function 722 over time in conjunction with a current reach 724. Similarly, FIG. 7C shows an impression function 732 over time is shown in conjunction with a current number of impressions 734.

The budget function 712, the reach function 722, and the impression function 732 may be determined by the ad performance module 135 based on various functions. In the examples of FIGS. 7A and 7C, the budget function 712 and the impression function 732 are linear, while the reach function 722 shown in FIG. 7B has a horizontal asymptote. In various embodiments, any suitable function may be used to determine the budget function 712, the reach function 722, and/or the impression function 732. The functions used to determine various objectives may be provided by an advertiser or determined by the social networking system through analysis of an advertising campaign or of various advertising campaigns.

In the examples of FIGS. 7A-7C, the advertising campaign has a duration of 5 days, a budget of 1 million dollars, an objective of 1 million impressions and a specified reach of 40,000 users. Based on the budget function 712 and the impression function 732, the social networking system 140 linearly paces use of the budget and presentation of advertisements form the advertising campaign. Similarly, the social networking system 140 paces presentation of advertisements from the advertising campaign to social networking system users not previously presented with at least one advertisement from the advertising campaign based on the reach function 722. Accordingly, the social networking system 140 distributes the 1 million budget across the five day duration based on the budget function 712 as shown in FIG. 7A, resulting in a daily budget of $200,000. Similarly, the social networking system distributes the 1 million impressions across five days based on the impression function 732 as shown in FIG. 7C, resulting in a daily impression goal of 200,000. In addition, the social networking system 140 distributes the reach of 40,000 different users across five days based on the reach function 722 as shown in FIG. 7B. Hence, after the first day, the advertising campaign is expected to have spent $200,000, provided 200,000 impressions and have a reach of 25,000 different users. At the end of the second day, the advertising campaign is expected to have spent $400,000, provided 400,000 impressions, and have a reach of 58,000 different users. After three days, the advertising campaign is expected to have spent $600,000, to have provided 600,000 impressions, and to have a reach of 94,000 different users.

During the actual run of the campaign, the actual values may deviate from the expected value. For instance, by the end of the first day, the advertising campaign had actually spent $140,000, had provided 260,000 impressions, and had a reach of 27,000. As a result, the advertising campaign spent $60,000 less than what was expected, provided 60,000 impressions more than what was expected, and had a reach 2,000 higher than what was expected.

In one embodiment, the goals for different intervals are adjusted according to the current performance of the advertising campaign. For example, if the current budget 714 expended after one day is $60,000 below the budget function 712, the budget allocated for the succeeding day is increased by $60,000. In the preceding example, budget for the second day is $260,000 instead of $200,000. Similarly, if 60,000 more impressions than the impression function 732 occur after the first day, the number of impressions for the second day may be reduced by 60,000, resulting in 140,000 rather than 200,000 impressions in the preceding example. Similarly, if advertising campaign has a reach of 2,000 additional unique users after the first day, the number of unique users to be presented with an advertisement from the advertising campaign is reduced by 2,000 unique users.

In other embodiments, a modified budget objective, a modified reach objective, and/or a modified impression objective are determined based on the remaining budget, impressions, and/or reach after a time interval. For example, if the advertising campaign spends $140,000 during the first day, the remaining budget of the advertising campaign is $860,000 after the first day. This remaining budget may be distributed among the remaining days using a linear function, resulting in a modified budget for the remaining days of $215,000 per day. Similarly, by the end of the first day, the advertising campaign has 260,000 impressions, resulting in 740,000 remaining impressions that are distributed among the remaining four days via the impression objective 732 for 185,000 impressions per day.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving information for an advertising campaign including one or more advertisements for presentation to one or more users of a social networking system, the advertising campaign associated with a budget, an impression objective, and a reach objective;
determining an interval impression objective specifying a first portion of the impression objective to be completed in an interval of the advertising campaign based at least in part on a predicted performance of the advertising campaign during the interval, the interval representing a portion of the duration of the advertising campaign;

determining an interval reach objective specifying a first portion of the reach objective to be completed in the interval based at least in part on the predicted performance of the advertising campaign;

determining, by a computer, one or more scaling filters based at least in part on a combination of the interval impression objective, the interval reach objective, the budget, and the performance of the advertising campaign, the one or more scaling filters being usable to select of one or more advertisements of the advertising campaign for inclusion in advertisement auctions;

during a first interval:
identifying a first plurality of opportunities to present advertisements to users of the social networking system,
determining whether to include one or more advertisements from the advertising campaign in auctions associated with the first plurality of identified opportunities based at least in part on the one or more scaling filters;

tracking, by the computer, a performance of the advertising campaign, the performance describing an impression count and a reach count from a start time of the advertising campaign, the impression count counting times an advertisement from the advertising campaign was presented to users of the social networking system and the reach count counting different users of the social networking system that were presented with an advertisement from the advertising campaign;

determining an updated interval impression objective specifying a second portion of the impression objective to be completed in a new interval of the advertising campaign based at least in part on the performance of the advertising campaign during the first interval;

determining an updated interval reach objective specifying a second portion of the reach objective to be completed in the new interval based at least in part on the performance of the advertising campaign during the first interval;

modifying, by the computer, the one or more scaling filters based at least in part on a combination of the updated interval impression objective and the updated interval reach objective; and during the new interval:
identifying a second plurality of opportunities to present advertisements to users of the social networking system,
determining whether to include one or more advertisements from the advertising campaign in auctions associated with the second plurality of identified opportunities based at least in part on the one or more modified scaling filters.

2. The method of claim 1, further comprising:
determining the predicted performance of the advertising campaign, the predicted performance describing a predicted number of impressions during the interval and a predicted amount of reach during the interval.

3. The method of claim 2, wherein determining the predicted performance of the advertising campaign, the predicted performance describing the predicted number of impressions during the interval and the predicted amount of reach during the interval comprises:
retrieving information describing previously completed auctions selecting one or more advertisements for presentation to users, the retrieved information including bid amounts associated with advertisements in the previously completed auctions; and
determining a number of the previously completed auctions in which an advertisement from the advertising campaign would have been selected, based at least in part on the retrieved information and bid amounts associated with advertisements in the advertising campaign.

4. The method of claim 2, wherein determining the predicted performance of the advertising campaign, the predicted performance describing the predicted number of impressions during the interval and the predicted amount of reach during the interval comprises:
determining a pacing factor based on an amount received from an advertiser associated with the advertising campaign at a start of the interval and the budget associated with the advertising campaign;
modifying bid amounts associated with advertisements in the advertising campaign based at least in part on the pacing factor;
retrieving information describing previously completed auctions selecting one or more advertisements for presentation to users, the retrieved information including bid amounts associated with advertisements in the previously completed auctions; and
determining a number of the previously completed auctions in which an advertisement from the advertising campaign would have been selected, based at least in part on the retrieved information and the modified bid amounts associated with advertisements in the advertising campaign.

5. The method of claim 2, wherein determining the predicted performance of the advertising campaign during the interval comprises:
retrieving information describing previously completed auctions including advertisements associated with targeting criteria matching targeting criteria associated with one or more advertisements in the advertising campaign; and
determining a number of the previously completed auctions in which one or more advertisements from the advertising campaign would have been selected based at least in part on bid amounts associated with advertisements in the advertising campaign.

6. The method of claim 2, wherein determining the predicted performance of the advertising campaign during the interval comprises:
retrieving information describing previously completed auctions including advertisements associated with targeting criteria similar to targeting criteria associated with one or more advertisements in the advertising campaign; and
determining a number of the previously completed auctions in which one or more advertisements from the advertising campaign would have been selected based at least in part on bid amounts associated with advertisements in the advertising campaign.

7. The method of claim 2, wherein determining, by the computer, the one or more scaling filters based at least in part on the interval impression objective, the interval reach objective, the budget, and the performance of the advertising campaign comprises:
determining a ratio of the interval impression objective to the predicted number of impressions during the interval.

8. The method of claim 2, wherein determining, by the computer, the one or more scaling filters based at least in part on the interval impression objective, the interval reach objective, the budget, and the performance of the advertising campaign comprises:
determining a ratio of the interval reach objective to the predicted amount of reach during the interval.

9. The method of claim 2, wherein determining, by the computer, the one or more scaling filters based at least in part on the interval impression objective, the interval reach objective, the budget, and the performance of the advertising campaign comprises:
determining a reach scaling filter based at least in part on a ratio of the interval reach objective to the predicted amount of reach during the interval; and
determining an impression scaling filter based at least in part on a ratio of the interval reach objective to the predicted amount of reach during the interval.

10. The method of claim 1, wherein determining the interval impression objective comprises:
determining a target impression objective specifying a number of impressions at a completion of the interval;
determining a current number of impressions associated with the advertising campaign;
comparing the target impression objective to the current number of impressions; and
determining the interval impression objective based at least in part on the comparison.

11. The method of claim 1, wherein determining the interval reach objective comprises:
determining a target reach objective specifying an amount of reach at a completion of the interval;
determining a current reach of the advertising campaign;
comparing the target reach objective to the current reach; and
determining the interval reach objective based at least in part on the comparison.

12. The method of claim 1, wherein at least one scaling filter from the one or more scaling filters is a percentage of auctions in which advertisements from the advertising campaign will be included.

13. The method of claim 1, wherein at least one scaling filter from the one or more scaling filters is a percentage of auctions for opportunities to present advertisements to users not previously presented with at least one advertisement from the advertising campaign in which an advertisement from the advertising campaign will be included.

14. A computer program product comprising a non-transitory computer-readable storage medium having instructions encoded thereon that, when executed by a processor, cause the processor to:
receiving information for an advertising campaign including one or more advertisements for presentation to one or more users of a social networking system, the advertising campaign associated with a budget, an impression objective, and a reach objective;
determine an interval impression objective specifying a first portion of the impression objective to be completed in an interval of the advertising campaign based at least in part on a predicted performance of the advertising campaign during the interval, the interval representing a portion of the duration of the advertising campaign;
determine an interval reach objective specifying a first portion of the reach objective to be completed in the interval based at least in part on the predicted performance of the advertising campaign;
determine one or more scaling filters based at least in part on a combination of the interval impression objective, the interval reach objective, the budget, and the performance of the advertising campaign, the one or more scaling filters being usable to select of one or more advertisements of the advertising campaign for inclusion in advertisement auctions;
during a first interval:
identify a first plurality of opportunities to present advertisements to users of the social networking system,
determine whether to include one or more advertisements from the advertising campaign in auctions associated with the first plurality of identified opportunities based at least in part on the one or more scaling filters;
track a performance of the advertising campaign, the performance describing an impression count and a reach count from a start time of the advertising campaign, the impression count counting times an advertisement from the advertising campaign was presented to users of the social networking system and the reach count counting different users of the social networking system that were presented with an advertisement from the advertising campaign;
determine an updated interval impression objective specifying a second portion of the impression objective to be completed in a new interval of the advertising campaign based at least in part on the performance of the advertising campaign during the first interval;
determine an updated interval reach objective specifying a second portion of the reach objective to be completed in the new interval based at least in part on the performance of the advertising campaign during the first interval;
modify the one or more scaling filters based at least in part on a combination of the updated interval impression objective and the updated interval reach objective; and
during the new interval:
identify a second plurality of opportunities to present advertisements to users of the social networking system,
determine whether to include one or more advertisements from the advertising campaign in auctions associated with the second plurality of identified opportunities based at least in part on the one or more modified scaling filters.

15. The computer program product of claim 14, wherein the non-transitory computer-readable storage medium further has instructions encoded thereon that, when executed by the processor, cause the processor to:
determine the predicted performance of the advertising campaign during the time interval, the predicted performance describing a predicted number of impressions during the interval and a predicted amount of reach during the interval.

16. The computer program product of claim 15, wherein determine predicted the performance of the advertising campaign during the interval, the predicted performance describing the predicted number of impressions during the interval and the predicted amount of reach during the interval comprises:
retrieve information describing previously completed auctions selecting one or more advertisements for presentation to users, the retrieved information including bid amounts associated with advertisements in the previously completed auctions; and determine a number of the previously completed auctions in which an advertisement from the advertising campaign would have been selected, based at least in part on the retrieved information and bid amounts associated with advertisements in the advertising campaign.

17. The computer program product of claim 15, wherein determine the predicted performance of the advertising campaign during the interval, the predicted performance describing the predicted number of impressions during the interval and the predicted amount of reach during the interval comprises:
    determine a pacing factor based on an amount received from an advertiser associated with the advertising campaign at a start of the interval and the budget associated with the advertising campaign;
    modify bid amounts associated with advertisements in the advertising campaign based at least in part on the pacing factor;
    retrieve information describing previously completed auctions selecting one or more advertisements for presentation to users, the retrieved information including bid amounts associated with advertisements in the previously completed auctions; and
    determine a number of the previously completed auctions in which an advertisement from the advertising campaign would have been selected, based at least in part on the retrieved information and the modified bid amounts associated with advertisements in the advertising campaign.

18. The computer program product of claim 15, wherein determine the predicted performance of the advertising campaign during the interval comprises:
    retrieve information describing previously completed auctions including advertisements associated with targeting criteria matching targeting criteria associated with one or more advertisements in the advertising campaign; and
    determine a number of the previously completed auctions in which one or more advertisements from the advertising campaign would have been selected based at least in part on bid amounts associated with advertisements in the advertising campaign.

19. The computer program product of claim 15, wherein determine the predicted performance of the advertising campaign during the interval comprises:
    retrieve information describing previously completed auctions including advertisements associated with targeting criteria similar to targeting criteria associated with one or more advertisements in the advertising campaign; and
    determine a number of the previously completed auctions in which one or more advertisements from the advertising campaign would have been selected based at least in part on bid amounts associated with advertisements in the advertising campaign.

20. The computer program product of claim 15, wherein determine the one or more scaling filters based at least in part on the interval impression objective, the interval reach objective, the budget, and the performance of the advertising campaign comprises:
    determine a ratio of the interval impression objective to the predicted number of impressions during the interval.

21. The computer program product of claim 15, wherein determine the one or more scaling filters based at least in part on the interval impression objective, the interval reach objective, the budget, and the determined performance comprises:
    determine a ratio of the interval reach objective to the predicted amount of reach during the interval.

22. The computer program product of claim 15, wherein determine the one or more scaling filters based at least in part on the interval impression objective, the interval reach objective, the budget, and the determined performance comprises:
    determine a reach scaling filter based at least in part on a ratio of the interval reach objective to the predicted amount of reach during the interval; and
    determine an impression scaling filter based at least in part on a ratio of the interval reach objective to the predicted amount of reach during the interval.

23. The computer program product of claim 14, wherein at least one scaling filter from the one or more scaling filters is a percentage of auctions in which advertisements from the advertising campaign will be included.

24. The computer program product of claim 14, wherein at least one scaling filter from the one or more scaling filters is a percentage of auctions for opportunities to present advertisements to users not previously presented with at least one advertisement from the advertising campaign in which an advertisement from the advertising campaign will be included.

* * * * *